United States Patent
Wirt et al.

[11] 3,913,702
[45] Oct. 21, 1975

[54] CELLULAR SOUND ABSORPTIVE STRUCTURE

[75] Inventors: Leslie S. Wirt, Newhall; Duane L. Morrow, Saugus, both of Calif.

[73] Assignee: Lockheed Aircraft Corporation, Burbank, Calif.

[22] Filed: Apr. 8, 1974

[21] Appl. No.: 458,676

Related U.S. Application Data

[63] Continuation-in-part of Ser. No. 366,794, June 4, 1973, abandoned.

[52] U.S. Cl. ............... 181/33 G; 181/33 H; 181/48
[51] Int. Cl. ............................................ B64d 33/06
[58] Field of Search .......... 181/33 G, 33 H, 33 HA, 181/33 HB, 42, 48, 50

[56] References Cited
UNITED STATES PATENTS

| | | | |
|---|---|---|---|
| 1,878,409 | 9/1932 | Lyford | 181/33 G UX |
| 2,916,101 | 12/1959 | Naman | 181/33 G UX |
| 2,975,853 | 3/1961 | Friend | 181/33 G UX |
| 3,144,913 | 8/1964 | Bailey | 181/33 HB UX |
| 3,177,970 | 4/1965 | Boschi | 181/33 G UX |
| 3,180,448 | 4/1965 | Gary et al. | 181/33 G UX |
| 3,353,626 | 11/1967 | Cremer et al. | 181/48 X |
| 3,437,173 | 4/1969 | Ehrich | 181/48 |
| 3,439,774 | 4/1969 | Callaway et al. | 181/33 G |
| 3,481,427 | 12/1969 | Dobbs et al. | 181/33 G |
| 3,734,234 | 5/1973 | Wirt | 181/33 G |

FOREIGN PATENTS OR APPLICATIONS

| | | | |
|---|---|---|---|
| 935,119 | 8/1963 | United Kingdom | 181/33 HA |
| 1,147,492 | 4/1969 | United Kingdom | 181/33 G |
| 348,808 | 9/1960 | Switzerland | 181/33 G |

*Primary Examiner*—Stephen J. Tomsky
*Assistant Examiner*—John F. Gonzales
*Attorney, Agent, or Firm*—Billy G. Corber; Ralph M. Flygare

[57] ABSTRACT

A sound absorbing structure comprising an orthogonal array of like cells, wherein each cell comprises a bundle of parallel, terminated, acoustical waveguides. The bundle of waveguides is cut obliquely so that individual waveguides vary substantially in length along the cut. The total admittance of acoustical energy to each absorber cell is the sum of the individual admittances of the waveguides comprising the bundle. The cell (unit bundle) structure is repeated throughout the array. A sound wave arriving at the open end of any cell in the array will encounter at least one waveguide which is effectively resonant at the frequency of the arriving wave. The admittance for the resonant waveguide will be large; the rest of the waveguides will not be resonant to that frequency (admittance is small). The local resonance serves to absorb acoustic energy at its frequency from an area up to about $\lambda^2/\pi$, where $\lambda$ is the wavelength of the sound to be absorbed. Operation of the structure is relatively independent of the materials from which it is made and is particularly suitable for sound attenuation in jet engines, high-velocity gas flow ducts, and other applications having similar adverse environmental conditions.

12 Claims, 6 Drawing Figures

CELLULAR SOUND ABSORPTIVE STRUCTURE

CROSS REFERENCE TO RELATED APPLICATION

This is a continuation-in-part of application Ser. No. 366,794 filed June 4, 1973, now abandoned.

BACKGROUND OF THE INVENTION

Various types of resonant sound absorbers have been proposed heretofore for use in silencers or mufflers for gas turbine exhaust ducts and similar adverse environmental installations. One such device is shown and described in U.S. Pat. No. 3,286,786, entitled "Gas Turbine Exhaust Silencer and Acoustical Material Therefor." Also, so-called "pan-pipes" types of structures have been proposed heretofore as sound absorbing wall treatments for ducts carrying high velocity gases. The pan-pipe structure comprises a plurality of resonators of diminishing sizes, linearly disposed, to be resonant at various frequencies. One such straight-line pan-pipe structure is shown in British Pat. No. 733,320. While these prior devices may be classified as the same general type of absorber as the present invention, namely multiple resonators, their performance is inferior to that of the present invention for reasons that will appear hereinafter.

There is also described in U.S. Pat. No. 3,734,234 entitled "Sound Absorption Structure," of common assignee herewith, a honeycomb sandwich type of sound absorption structure having an oblique resistive partition disposed within each honeycomb cell. In the development of this particular prior invention it was found that the computed impedance plots correlated very closely with all empirical data so long as the resistance of the oblique partition was near optimum or below. However, it was found that beginning with an acoustical resistance somewhat above optimum, the analytical model failed to predict the experimental results. In this high-resistance region, computer-derived predictions indicated a potentially useful characteristic; namely, an acoustic resistance which increases with frequency and a reactance which rapidly approaches and remains at or near zero. The simple analytical model, upon which the computer program for producing the aforementioned impedance plots was based, assumed that the basic waveguide was subdivided into a large number (namely, 100) of parallel waveguidelets, each of which functions independently of the others. The total admittance A is, then, the sum of the independent admittances of the waveguidelets, each of which can be computed from its geometry by classical means.

$$\text{Thus: } A = \sum_n A_n \quad A_n = \frac{1}{Z_n}$$
$$Z = \frac{1}{A}$$

Where:
$A$ = Acoustic admittance  $n$ = Index number  $Z$ = Acoustic Impedance

In accordance with the present invention it has been found that experimental data can be made to yield the above-mentioned desired characteristics by physically subdividing the cell into 100 (or an appropriately large number of) waveguidelets.

SUMMARY OF THE INVENTION

There is provided by the present invention a sound absorptive structure comprising a two-dimensional array (as contrasted with a straight-line or linear array) of contiguous waveguides, open at one end to receive sound waves to be absorbed and of dissimilar lengths. The ratios of the lengths of the several waveguides conform to specified parameters, so as to provide a wide range of lengths within each functional group or bundle, hereinafter referred to as a cell. Also, the flow resistance of the cell is constrained within prescribed limits for optimum performance, this parameter being controlled by the geometry of the waveguides, and, in certain cases augmented by a flow-resistive facing sheet. Each waveguide is terminated with a reflective termination. Each element of a sound wavefront approaching the array finds at least one waveguide within a surrounding area $\lambda^2/\pi$ (viz., "capture area") which is effectively resonant at the frequency of its approaching wave. The local resonance serves to absorb the acoustic energy at its frequency throughout a capture area of about $\lambda^2/\pi$. This is the basic operating principle of all resonator arrays in the prior art and, of course, this effect occurs in the present invention as well.

It has now been discovered that the sound absorbing efficiency and bandwidth of absorption may be substantially improved provided only that certain further geometric constraints are adhered to which assure another additional mechanism of sound absorption. Given one waveguide of length $L_1$, and hence resonant at some frequency $F_1$, and a second waveguide of length $L_2 = \frac{1}{2} L_1$ resonant at frequency $F_2 = 2F_1$, then as frequency is swept from $F_1$ to $F_2$ first the longer waveguide of length $L_1$ will resonate and then the second waveguide of length $L_2$ will resonate at frequency between $F_1$ and $F_2$ such as their average resonant frequency $$F = \frac{F_1 + F_2}{2}$$

both waveguides are relatively inactive. It should be noted at this point that the responses of the two waveguides to the intermediate frequency $F_1$ are opposite in phase relative to the instantaneous sound pressure. If sound pressure strikes the two at the same instant the associated airflow is into one waveguide and out of the other in a "push-pull" manner. This corresponds to the mathematical statement that $Z_1$ and $Z_2$ are opposite in sign.

If and only if the two waveguides are sufficiently close together to assure significant overlap of their capture area do they interact with each other rather than simply responding slightly and independently to the intermediate sound frequency. If their capture areas overlap then the push-pull phasing in their responses sets up a vigorous local circulation (viz., near field) with an associated substantial energy absorption to the intermediate frequency sound.

Thus, an important feature of this invention is in part the provision of the geometry required to assure that for virtually every given waveguide, a second waveguide is present within a distance assuring the overlap of their capture areas and thus assuring the substantially increased efficiency of sound absorption.

A sound wave approaching the array finds at least one waveguide within an area = $\lambda^2/\pi$ which is effectively resonant at the frequency of the approaching wave. The remaining waveguides within the area are not resonant to that frequency. The local resonance serves to absorb the acoustic energy at its frequency throughout a capture area of up to about $\lambda^2/\pi$. Thus, the resonant waveguide effectively serves the entire area. While it is desirable to have the waveguides as close as possible to each other, practical considerations dictate the actual minimum spacing between interacting waveguides. As the spacing between interacting waveguides increases, the overall sound absorption performance becomes progressively degraded. A practical, though somewhat arbitrary, limit for the maximum spacing between the two interacting waveguides may be defined as no more than the length of the longer waveguide of the pair. To attain the required inner geometry the entire pattern of the array is repeated at frequent intervals giving a striped or checkered appearance and is an essential distinguishing feature between the present invention and the previously-described prior art devices which utilize an assortment of differently tuned resonators distributed in some arbitrary manner.

It is therefore an object of the present invention to provide a novel and improved sound absorptive structure, suitable for use under extreme environmental conditions such as that which exists in engine exhaust ducts or the like.

Another object of the invention is to provide a novel and improved sound absorptive structure which will function over a wider range of frequencies than that of generally similar devices of the prior art.

Still another object of the invention is to provide a novel and improved sound absorptive structure that provides useful acoustical properties not obtainable from any other means, namely an acoustical resistance that increases with frequency and a reactance that remains essentially at zero.

DESCRIPTION OF THE PREFERRED EMBODIMENT

Figure 1:
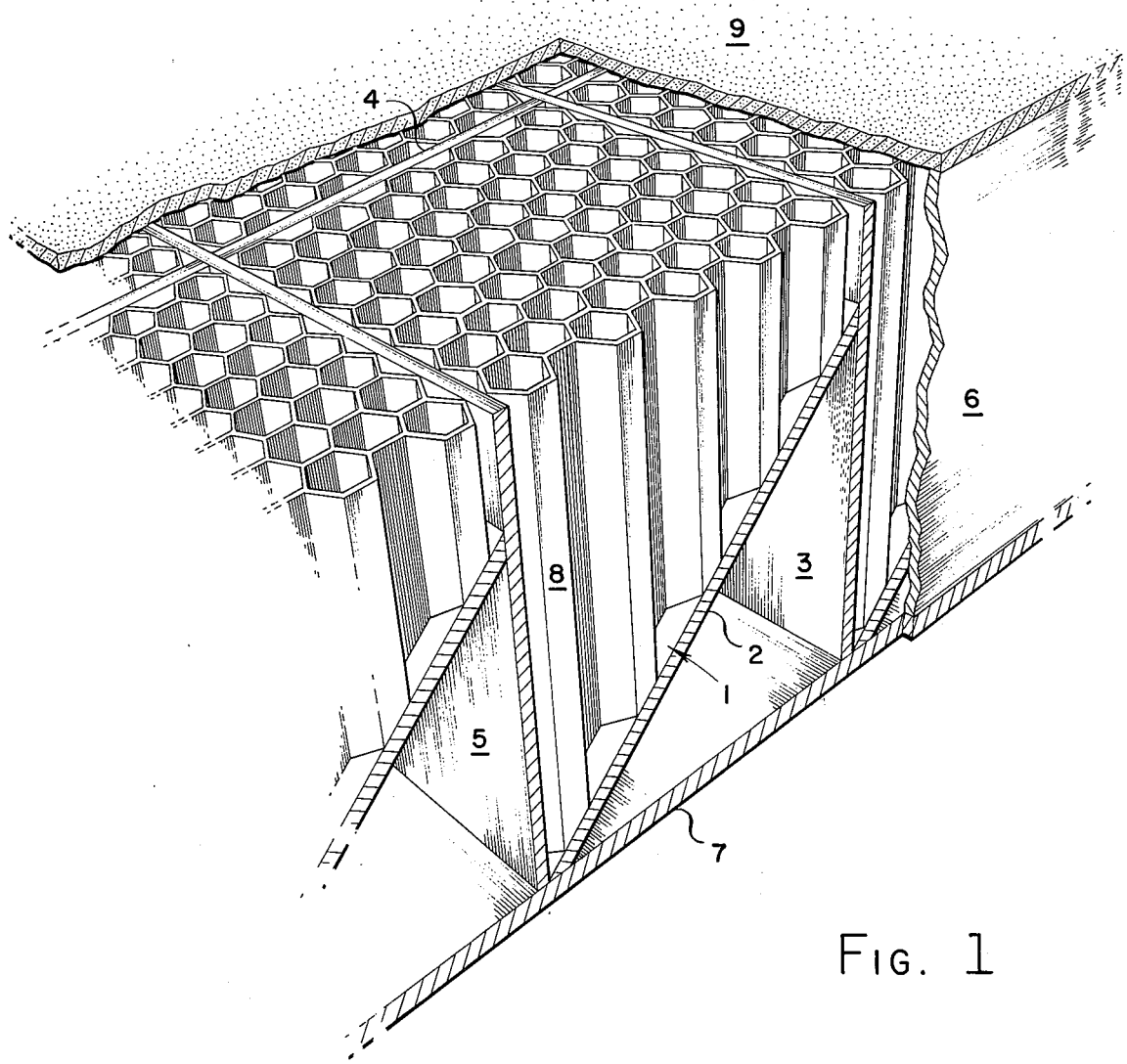
FIG. 1 is a perspective view, partially broken away, illustrating a first preferred embodiment of the invention.

The present invention comprises a resonant-type absorber which offers an unusually wide absorption frequency range. As shown in FIG. 1, a typical embodiment comprises a fine honeycomb core structure 1 having proximate bundles of waveguides, each terminated at the closed ends by an oblique partition 2. Each operative unit is enclosed within a group bounded by wall members 3–6 and consists of a bundle (large in number) of parallel acoustical orifices and waveguides. The bundle of waveguides (1) is cut obliquely so that the effective lengths of the waveguides vary along the plane of the cut. The preferred angle of the oblique cut will be discussed more fully hereinafter. A porous or non-porous sheet or partition 2 is located at the plane of the cut. It is required only that the oblique element (2) be sound reflective either by virtue of a high flow resistance, or by being solid, or by virtue of having considerable acoustic impedance. In a practical construction, the structure may include an impermeable backing sheet 7.

Honeycomb core, of conventional and well-known construction, may be used in the fabrication of the waveguides. The core may comprise hexagonal cross-section honeycomb, as shown in FIG. 1, or may have various other cross-sectional shapes such as round, square, triangular, etc. In a typical construction there are a total of 100 waveguides, each ⅛ inch across, located in each group. Since there is more than one waveguide of each length within the group, in this particular embodiment, the group functionally may comprise more than one "cell" as previously defined. In FIG. 1 wall member 6 is shown as being broken away from the described group in order to expose the construction of the internal elements. The depth of the deepest honeycomb core element (e.g., element 8) may, for example, be one inch. A complete cycle of depths (viz., the intergroup spacing) should be located within a similar distance. Because of the "sawtooth" topography of the end-closing partition of the groups, if planned for use as a duct lining, the device may have a preferred orientation relative to the direction of the impinging sound and air flow. Also, the device optionally may be provided with a sound permeable facing sheet 9 for structural, esthetic or other purposes.

The core or honeycomb structure 1 making up the bundle of waveguides may be fabricated from plastic, paper, metal, ceramic, or other suitable material as dictated principally by the intended environment of operation and/or economic constraints. Similarly, the group enclosing walls (e.g., 3–6) and the backing sheet 7 may be made of either metal or non-metallic materials as may be appropriate. The entire structure may be assembled by welding, adhesive bonding, mechanical interlocking arrangement, or other suitable means. It is the geometry and configuration of the elements that principally determine the operating parameters, rather than the intrinsic properties of the materials from which the device is constructed. Hence, the designer has a wide range of design alternatives with respect to selection of materials for fabrication.

A sound wave approaching the array of differently tuned waveguides (1) will encounter at least one that is resonant, or nearly so, at that frequency (viz., admittance is large). The remaining waveguides within the cell (3–6) are not resonant to that frequency (viz., admittance is small). The local resonance absorbs some of the acoustic energy at its frequency through an area as large as about $\lambda^2/\pi$. For this reason the cell pattern is repeated so as to cover contiguous $\lambda^2/\pi$ areas. At the lower frequencies a particular waveguide may be resonant for the entire cell by reason of the fact that the cell is dimensioned to be within the aforementioned spacing constraint. Above a frequency roughly double the lowest resonant frequency the capture area $\lambda^2/\pi$ becomes less than the cell area and the resonance mechanism becomes progressively less effective. For the geometry shown in FIGS. 1–4 the length of any two waveguides differ so abruptly that the overlap of their capture areas is apparent within the confines of the cell. The response of any such cell pair to any frequency intermediate between their resonant frequency is of the nature of a push-pull because the shorter one is operating below resonance ($Z < 0$) and the longer one is above resonance ($Z > 0$).

The resulting vigorous near field leads to viscous losses which provide the dissipation of energy needed to attenuate the sound. In this way and by this mechanism the sound absorption remains large even at very high frequencies for which the actual capture areas have become very small.

The intense near field sonic activity occurring within the waveguides provides the necessary damping for efficient sound absorption even though the terminating plate (partition 2) is not designed to be permeable. Damping due to scrubbing on the walls of small tubes (1) is proportional to frequency, which helps to explain the increasing acoustic resistance that has actually been observed in practical constructions.

The oblique element terminating the waveguides (viz., partition 2) should, as has previously been mentioned, be substantially reflective; hence, the reason for a solid partition in a preferred construction. However, this element may derive its reflectance by virtue of a high flow resistance, or by having considerable acoustic inertance. For example, an oblique termination operating as a high-inertance mechanism may comprise a foraminous plate having a small percentage of open area. This would yield the required reflectance, but would desirably provide liquid drainage to each waveguide as may be required in certain types of installations.

In the embodiment of FIG. 1, the group enclosure comprising wall members 3–6 is shown to have a square cross section. This shape is arbitrary. If desired, the boundaries of a cell or group of cells may, as in the case of the waveguides, have any desired cross-sectional shape such as hexagonal, round, triangular, rectangular, etc. The principal operating parameter with respect to the configuration of the cell is that it have a maximum over-lapping of capture areas between as many waveguide pairs as possible. Also, the construction shown in FIG. 1 employs an oblique planar partition 2 for terminating the plurality of waveguides within the corresponding cell. As will be appreciated, partition 2 need not be planar since other surface configurations such as conical, exponential, etc., could be utilized and still yield the necessary differences in depth of the several nearby waveguides. The essential consideration is that the bundle of waveguides be terminated in such a manner that the depths of the several waveguides vary through a range of dimensions sufficiently wide to accommodate the sound spectrum of interest.

In order to obtain the desired area overlap or "capture effect" of the closely-spaced waveguides, it is necessary to have at least one waveguide within each cell which is below resonance and one above resonance at the frequency of the incoming wave. To assure this, the ratio of length of the longest waveguide to that of the shortest waveguide should be as high as possible. That is, the rate of change of waveguide length (the slope of oblique partition 2) is an important parameter. Sufficient slope improves performance and permits the use of coarser, larger cell sizes. Since each waveguide has an effective sound-receiving area that is greater than its actual cross-sectional area, the waveguides comprising each cell should be so tightly packed that the "effective" area of any waveguide at resonance always overlaps the effective areas of any other waveguide at anti-resonance. This is accomplished by varying the lengths of the waveguides within the cell abruptly. This is assured if the angle of elevation of the partition 2 is at least 45°. Below 45°, the resonators take increasingly independent operating (viz., non-parallel) characteristics, and performance deteriorates. For angles greater than 45°, little further improvement occurs at the lower frequencies, but some further improvement occurs at very high frequencies.

The invention operates because the differing waveguides are not only tuned to different resonant frequencies, but also because they act with predetermined phase relationships. Specifically, they are spaced closely enough to permit phased interaction rather than independent operation.

Any resonator undergoes a rapid phase shift of the oscillating flow relative to the pressure wave as the frequency passes from below resonance to above resonance. If the damping is relatively light, this phase shift amounts to nearly 180°. Thus, given two widely spaced apart resonant tubes, one of which is twice the length of the other, at any given frequency between the two first resonant frequencies the flow will be entering the first tube and will be leaving the second tube at a particular instant in time. If the two tubes are placed close enough together, their effective areas will overlap. To assure this, the center-to-center distance between the tubes must be reduced to approximately one-quarter wavelength of the resonant frequency of the shorter tube. Since one tube is only half the length of the other, the angle between the common entrance plane of the pair of tubes and that of the closed ends of the tubes is about 45°. If this angle is much less than 45°, the geometry requires that they be more widely spaced apart and the consequence is that they will act independently.

If, on the other hand, the effective areas of the two resonators overlap, a vigorous interaction occurs and they no longer act independently, but rather are said to act in parallel coupling. At frequency $F_1$, the first tube is resonant and the second tube quiescent, and conversely. At frequency $$F = \frac{F_1 + F_2}{2}$$

a resonant-like condition exists involving a strong local circulation between the two tubes. This is called a "near field." This vigorous near field local circulation into and out of both tubes results in much greater acoustical energy absorption than the combined effect of the resonators acting independently at frequency F because neither is resonant by itself at F.

To assure the desired parallel coupling with practically realizable geometries, while maintaining the necessary small inter-cell spacing, requires that the ratio of the depths of the shortest waveguide to the longest waveguide in any given cell be quite large (i.e., equal to or greater than 1:2). This corresponds to a large diagonal slope (i.e., ≥ 30°) of the plane through the closed ends of the waveguides).

Figure 2:
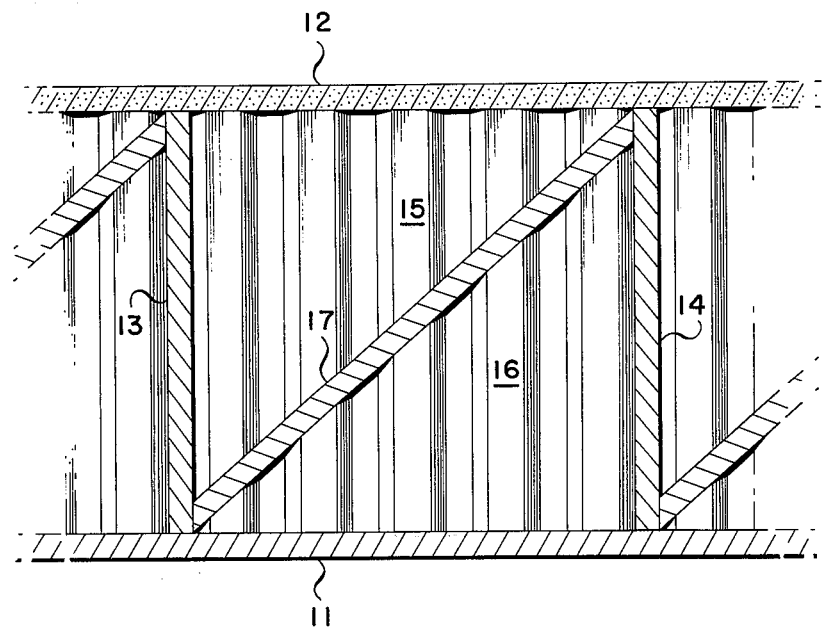
FIG. 2 is a side elevation view of a second embodiment of the invention employing an internal supporting structure.

Other structural modifications may be made to provide load-bearing properties or other characteristics dictated by the intended operating environment. For example, there is shown in FIG. 2 a cross-sectional elevation view of a resonant type sound absorber panel constructed in accordance with the invention, having potentially greater structural strength than the configuration of FIG. 1. This embodiment comprises a non-porous backing sheet 11 and a substantially sound transparent facing sheet 12. Cell enclosing walls 13 and 14 are perpendicularly disposed between mutually confronting backing sheet 11 and spaced apart facing sheet 12. The bundle of waveguides within each cell is fabricated from an integral honeycomb core element. In the course of manufacture of the panel, the honeycomb core element for each cell is first cut on a bias so as to divide the element into an upper and lower section 15 and 16, respectively. The reflective terminating partition 17 is then interposed between the upper and lower sections 15 and 16. The operative, sound absorbing, section 15 is exposed to the incoming sound wave through sound-transparent facing sheet 12. The lower section 16 serves primarily to support the partition 17 and lend structural rigidity to the overall device. Also, this construction minimizes the requirements for attaching or otherwise securing the partition and the waveguide members to the adjoining cell-defining members. Again, it is not necessary that the partition 17 be a planar oblique element since it could have a curved, angular, or other compound shape, as desired, to vary the effective depth of the tubular sound-receiving portions of the honeycomb element 15.

Figure 3:
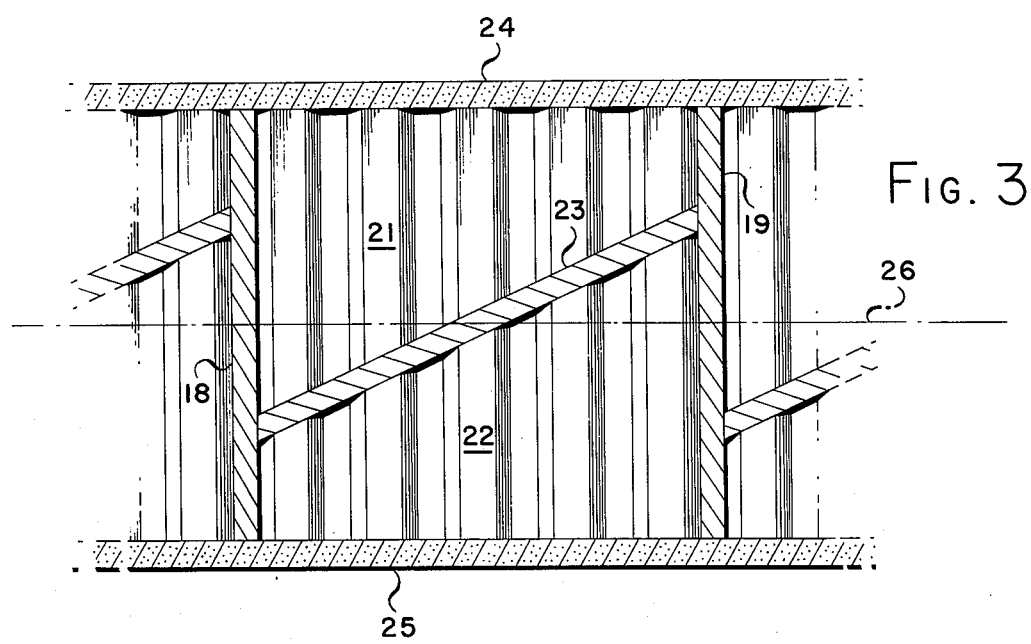
FIG. 3 is a side elevation view of a third embodiment of the invention comprising a sound absorptive panel which is functionally effective on both faces.

There is shown in FIG. 3 yet another embodiment of the invention which is characterized by having two sound absorbing faces. This embodiment is generally similar to that of FIG. 2 and comprises group-defining wall members 18 and 19, and upper and lower honeycomb core sections 21 and 22, respectively. The core sections 21 and 22 are separated by an interposed sound reflective partition 23. Unlike the construction of FIG. 2 (which has a non-porous backing sheet 11), the embodiment of FIG. 3 is provided with separate sound transparent sheets on both sides of the panel. That is, the waveguide bundle comprising upper section 21 is covered by sound transparent sheet 24, and the waveguide bundle comprising lower section 22 is covered by sound transparent sheet 25. Since the panel structure is symmetrical about its central axis 26, sound approaching either side of the panel will be absorbed. As in the case of the previously described embodiments, the topography of the partition that reflectively terminates the waveguide may be either planar or curved as desired.

Figure 4:
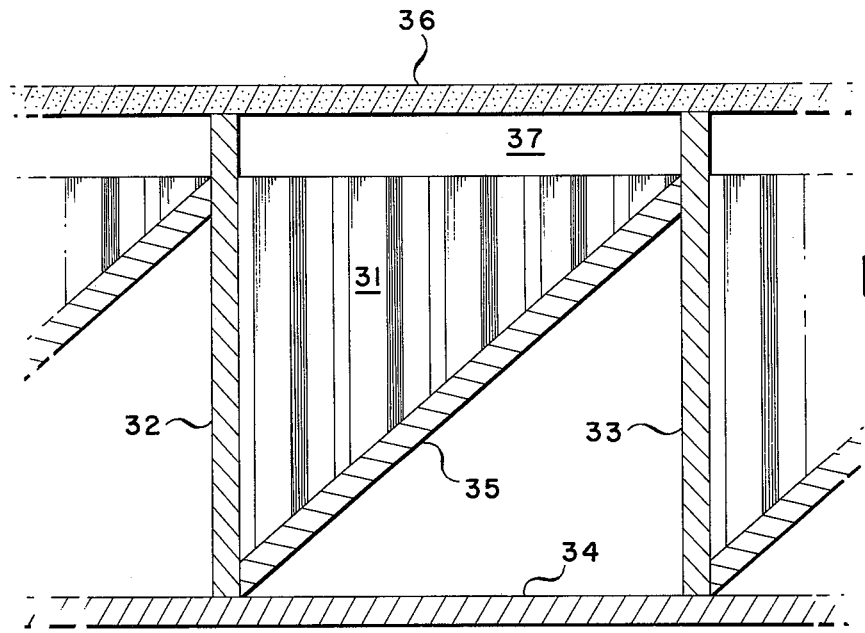
FIG. 4 is a modification of the apparatus of FIG. 1 wherein the cells are recessed within individual compartments having a common facing sheet.

There is shown in FIG. 4 an alternative embodiment of the invention. This construction comprises a plurality of cell groups each enclosed on four sides. Typical wall members enclosing the sides of the cell groups are indicated at 32 and 33. It should be understood that the two remaining wall members (not shown in FIG. 4) for the cells bounded by members 32 and 33 are orthogonally disposed thereto in order to form a four-sided cell group having a square cross section. This square shape is arbitrary and is by way of example only. A bundle of waveguides 31 is located within the cell group. The open, sound-receiving, ends of the waveguides (31) are at the top of the cell group, as viewed in FIG. 4. A solid wall member 34 closes the bottom ends of the cell groups. An oblique planar partition, such as that indicated at 35, terminates the plurality of waveguides within each cell. A permeable facing sheet 36 extends across the open ends of all of the cell groups.

As can be seen, the depth of the cell groups is greater than the depth of the longest waveguide disposed therein, thereby providing an open area or cavity 37 between the sound receiving ends of the waveguides and the permeable facing sheet 36. That is, the bundle of waveguides 31 is recessed within the cell cavity so as to be spaced apart from the facing sheet 36. Functionally, the facing sheet 36 is common to all of the cells comprising the array, and operates as a series acoustical resistance for the entire array. This arrangement provides a slightly different absorption spectrum shape than would be obtained without the cavity 37. The configuration shown in FIG. 4 is preferred where it is desired that a coarse perforate be used having holes comparable to the diameter of the waveguide entrances. To facilitate a comparison between these two embodiments of the invention there is shown in FIGS. 5 and 6 electrical network analogs which correspond to the acoustical apparatus of FIG. 4 and FIG. 1, respectively.

Figure 5:
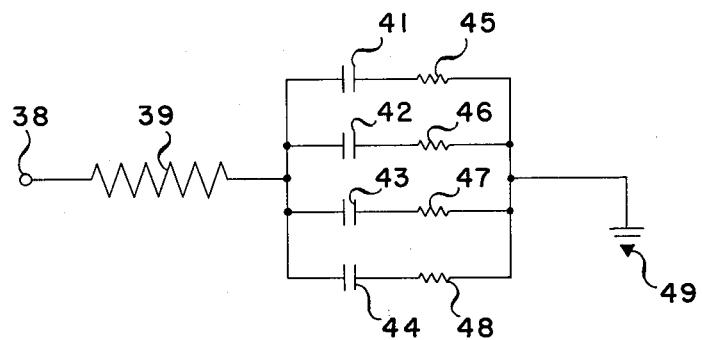
FIG. 5 is a network circuit analog of the apparatus of FIG. 4.

Referring first to FIGS. 4 and 5 there is shown the electrical network equivalent of the apparatus of FIG. 4 wherein terminal 38 comprises the input to the device, and series resistance 39 corresponds to the acoustical resistance of the facing member 36. The capacitive reactance, and the wall-scrubbing resistance of each cell in the array (as provided by the then-active waveguide within each cell) is represented by a series capacitance and resistance. For example, the active waveguide in the first cell corresponds to capacitance 41 and resistance 45, the next cell corresponds to capacitance 42 and resistance 46, and so forth throughout the parallel array comprising branch capacitances 41–44 and series resistances 45–48. The network is referenced to ground terminal 49.

As can be seen, resistance 39 (and hence the flow resistance of facing sheet 36) is in series with the parallel combination of all of the capacitances 41–44 and resistances 45–48 (which correspond to the overall array).

Figure 6:
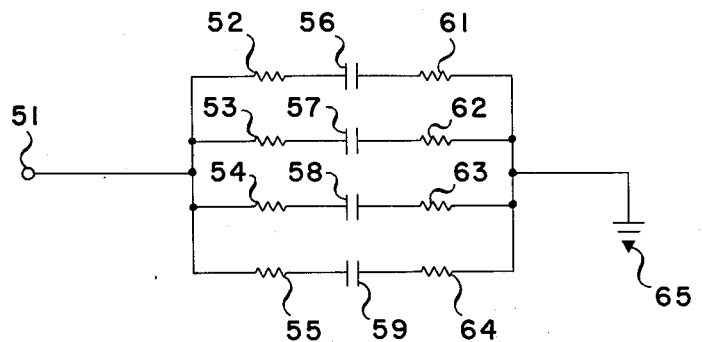
FIG. 6 is a network circuit analog of the apparatus of FIG. 1.

The network of FIG. 6 corresponds to the apparatus of FIG. 1 and is provided with an input terminal 51. Resistances 52–55 correspond to the resistances of the individual areas of the facing sheet 9 which extend over the open area of each individual waveguide within a cell. Capacitances 56–59 correspond to the acoustical capacitive reactances of corresponding waveguides, and resistances 61–64 correspond to the scrubbing resistances of corresponding waveguides. The network is referenced to ground 65.

Certain precautions must be taken with respect to obtaining valid results from the foregoing network analogs. The parallel waveguides can be represented by their parallel circuit elements only if the waveguides are packed so closely that they act in parallel (i.e., if their capture areas overlap such that they act in parallel rather than independently). Acoustic resistances and reactances must be expressed in units of acoustical ohms to be analogous to electrical ohms.

The acoustic reactance of the waveguide is in reality of the form:

$$X = -j \cot \frac{\omega}{c} L$$

and is approximated by a capacitance only at low frequencies.

In summary, the present invention, in all embodiments, comprises a parallel-coupled system because of the close constraint of the inter-cell spacing and because of the wide range of depths of the waveguides, whereby the effective areas of the waveguides at resonance always overlap with the areas of other waveguides at anti-resonance.

Other modifications may be made in order to accommodate particular applications. For example, the overall structure may have a curved shaped (as contrasted with planar facing or backing sheets) as may be required for lining a circular duct or other curved boundary. Also, the facing sheets may be omitted without impairing the sound absorptive properties of the device. Still other modifications may be made by those versed in the art without departing from the invention as set forth above.

What is claimed is:

1. A sound absorbing panel comprising:
    first and second spaced-apart waveguide arrays each comprising a plurality of side-by-side acoustical waveguides of non-uniform length and having adjacent open ends defining the sound-receiving end of the array, the sound receiving end of like waveguides in each of said arrays being spaced from each other by a distance not more than approximately the wavelength of the highest frequency to be absorbed divided by the square root of pi; and
    a plurality of waveguide terminating means each of which is disposed with respect to a corresponding one of said waveguides at the end thereof opposite said open end so as to result in that one waveguide having a resonant frequency that is different from the resonant frequencies of those waveguides having different lengths, comprising said array.

2. A sound absorbing panel as defined in claim 1 including:
    an impermeable backing sheet disposed adjacent the ends of said waveguides opposite said open ends.

3. A sound absorbing panel as defined in claim 1 including:
    a relatively sound-transparent facing sheet overlying the sound-receiving ends of said arrays.

4. A sound absorbing panel as defined in claim 1 including:
    a permeable, flow-resistive, facing sheet spaced apart from and extending across the sound-receiving ends of said arrays.

5. A sound absorbing panel as defined in claim 1 wherein each of said waveguides has an hexagonal cross-section.

6. A sound absorbing panel as defined in claim 1 wherein each of said arrays has a square cross-section.

7. A sound absorbing panel as defined in claim 1 wherein said terminating means comprises:
    a planar impermeable sheet closing like ends of the waveguides comprising each array.

8. A sound absorbing panel as defined in claim 7 wherein said planar impermeable sheet is disposed at an angle, with respect to said sound-receiving end of the array, which is $\geqslant 30°$.

9. A sound absorbing structure, comprising:
    a plurality of acoustical waveguides having dissimilar lengths such that $l_n = (l-n\Delta)l_o$, where $l_o$ is equal to the length of the longest of said waveguides $l_n$ is the length of the $n^{th}$ waveguide and $n$ is an index number 0,1,2,3, and $\Delta$ is the decrement of length, said waveguides having their sound-receiving ends in mutual proximity; and,
    a plurality of terminating means, equal in number to the number of said waveguides, each of which acoustically terminates a corresponding one of said waveguides at the end thereof away from the sound-receiving end, said plurality of waveguides being disposed with respect to each other in such a way that for any one waveguide of a first given length other than the shortest of said wave guides there is another waveguide approximately half as long as said first given length with its sound-receiving end disposed with respect to the sound-receiving end of said one waveguide, at a center-to-center distance which is not greater than said first given length.

10. A sound absorbing structure as defined in claim 9 including:
    a relatively sound-transparent, flow resistive, sheet covering said sound-receiving ends of said plurality of waveguides.

11. A sound absorbing structure as defined in claim 9 wherein said waveguides comprise contiguous honeycomb cells.

12. A sound absorbing structure as defined in claim 11 including:
    an impermeable backing sheet; and,
    honeycomb cell support means interposed between, and abutting, said plurality of end closing means and said backing sheet.

* * * * *